United States Patent
Park et al.

(10) Patent No.: US 7,696,933 B2
(45) Date of Patent: Apr. 13, 2010

(54) RADIO RECEIVING APPARATUS

(75) Inventors: Hark Byeong Park, Suwon-si (KR); Byong Su Seol, Yongin-si (KR); Huyn Ho Park, Daejeon (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 238 days.

(21) Appl. No.: 11/746,880

(22) Filed: May 10, 2007

(65) Prior Publication Data

US 2008/0174513 A1   Jul. 24, 2008

(30) Foreign Application Priority Data

Jan. 22, 2007  (KR) .................... 10-2007-0006602

(51) Int. Cl.
   *H01Q 1/24*   (2006.01)
(52) U.S. Cl. ...................... 343/702; 343/841
(58) Field of Classification Search ............... 343/702, 343/841
   See application file for complete search history.

(56) References Cited

U.S. PATENT DOCUMENTS 5,360,353 A * 11/1994 Kinoshita ............ 439/620.09
5,568,157 A * 10/1996 Anderson ................ 343/713
7,015,864 B2 * 3/2006 Lin et al. ................. 343/702

FOREIGN PATENT DOCUMENTS

JP   2003-223248   8/2003
KR   2006-32018    4/2006

* cited by examiner

*Primary Examiner*—Tan Ho
(74) *Attorney, Agent, or Firm*—Stanzione & Kim LLP

(57) ABSTRACT

A radio receiving apparatus deterioration of a receiving sensitivity of an antenna used in the radio receiving apparatus due to noise generated from a circuit board disposed within the radio receiving apparatus. The radio receiving apparatus includes a body, a printed circuit board provided within the body, an antenna provided at an area outside of the body and adapted to receive an external signal, and a noise attenuation member provided at the printed circuit board and adapted to attenuate noise generated from the printed circuit board, to prevent deterioration in the receiving sensitivity of the antenna.

16 Claims, 11 Drawing Sheets

RADIO RECEIVING APPARATUS

CROSS-REFERENCE TO RELATED APPLICATIONS

This application claims priority under 35 U.S.C. § 119(a) from Korean Patent Application No. 2007-0006602, filed on Jan. 22, 2007 in the Korean Intellectual Property Office, the disclosure of which is incorporated herein in its entirety by reference.

BACKGROUND OF THE INVENTION

1. Field of the Invention

The present general inventive concept relates to a radio receiving apparatus, and more particularly, to a radio receiving apparatus to prevent deterioration in radio receiving performance of an antenna due to noise generated from a printed circuit board provided in the radio receiving apparatus.

2. Description of the Related Art

Radio receiving apparatuses have convenient portability and serve to reproduce moving images, or other visual or audio information based on a radio signal received thereby. Examples of the radio receiving apparatuses include wireless portable communication terminals for receiving digital multimedia broadcasting (DMB), wireless internet signals, or Bluetooth® signals, and portable multimedia players (PMPs).

Figure 1A:
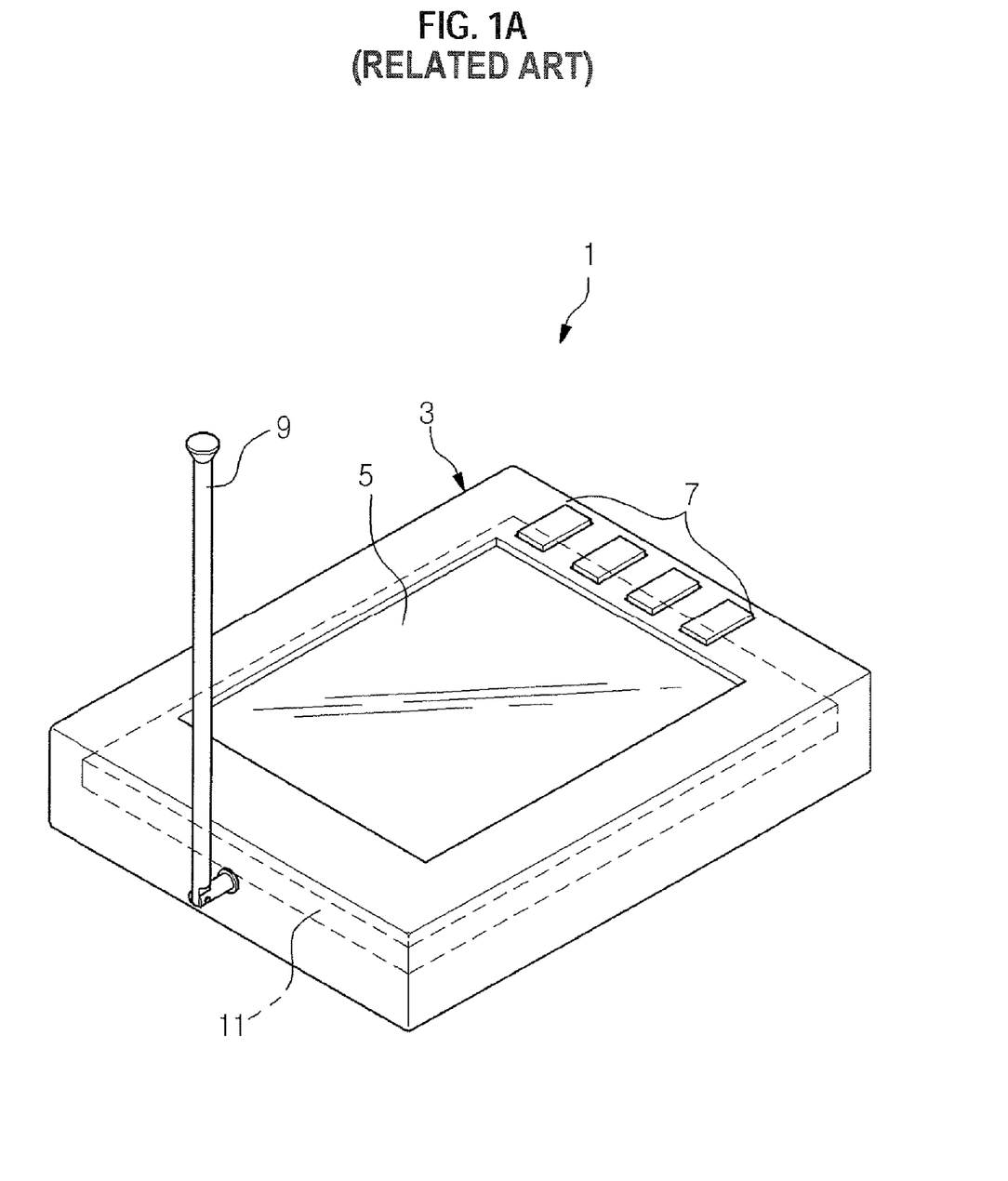
FIG. 1A is a perspective view illustrating a conventional radio receiving apparatus.

FIG. 1A illustrates a configuration of a conventional radio receiving apparatus 1. As illustrated in FIG. 1A, the conventional radio receiving apparatus 1 includes a body 3 defining an outer appearance of the radio receiving apparatus, a display 5 provided at a front surface of the body 3, a button array 7 provided on the body 3 at the side of the display 5 for manual operation of the radio receiving apparatus 1, an antenna 9 attached to a side surface of the body 3 for receiving a radio signal from an external station, and a printed circuit board (PCB) 11 on which a variety of devices, related to an operation of the radio receiving apparatus, are arranged.

Figure 1B:
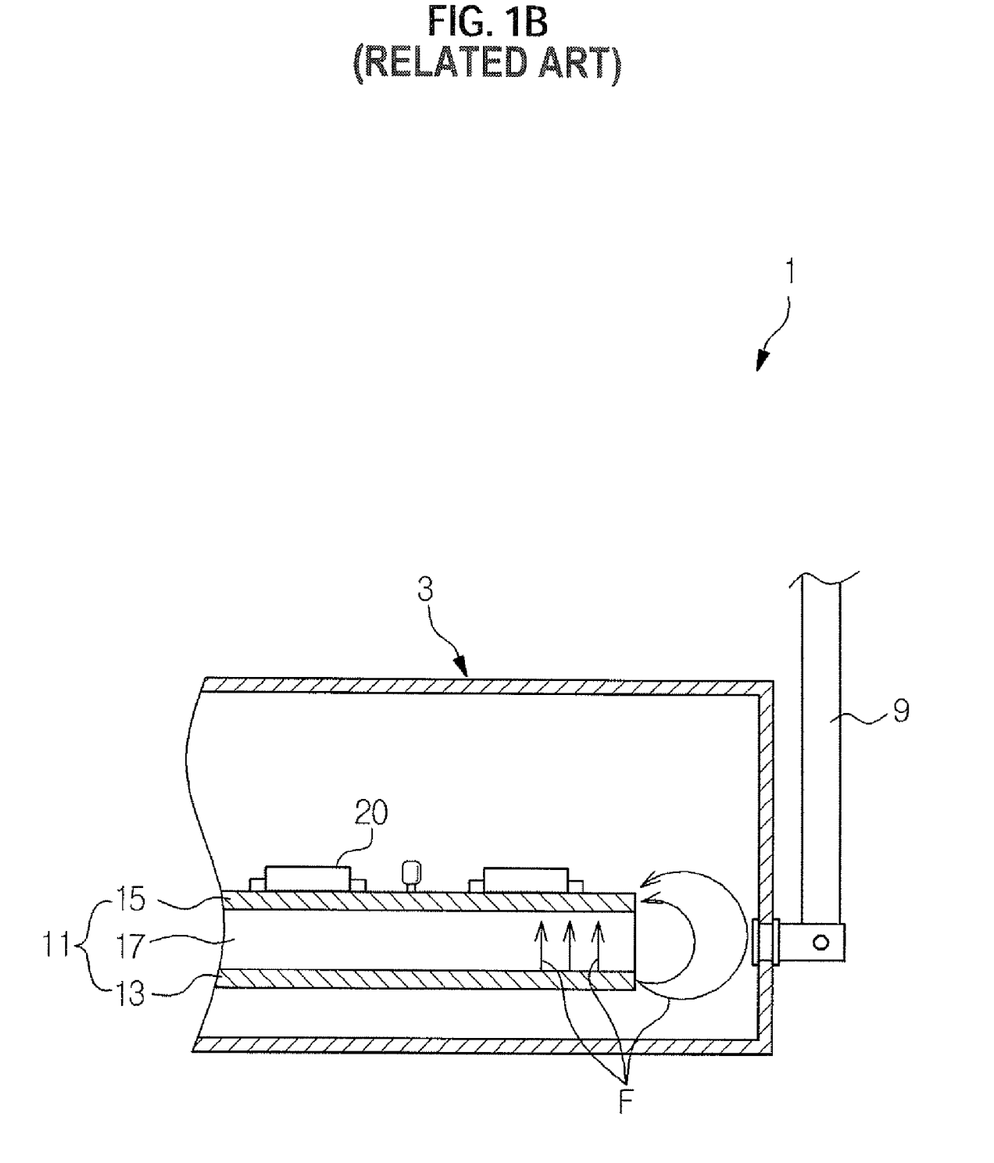
FIG. 1B is a side sectional view of the conventional radio receiving apparatus of FIG. 1.

Referring to FIG. 1B, the printed circuit board 11, which is provided within the radio receiving apparatus, includes a power plane 13 for the supply of power, a ground plane 15 spaced apart from the power plane 13, the ground plane 15 serving as a standard plane for power and signal distribution, and a dielectric layer 17 provided between the power plane 13 and the ground plane 15. A variety of operating devices 20 are arranged on the power plane 13 or ground plane 15. Also, for the flow of current and the transmission of signals, the power plane 13 or ground plane 15 is formed with a pattern (not illustrated).

If the radio receiving apparatus 1 operates, an electromagnetic field F is generated within and around the printed circuit board as illustrated by the arrows, thereby causing electromagnetic wave noise.

Here, the electromagnetic wave noise includes switching noise caused by On/Off operation of the variety of devices 20 arranged on the printed circuit board 11 and other noises caused, for example, by a current and a signal moving along the pattern formed on the printed circuit board 11.

The resulting electromagnetic wave noise causes electromagnetic interference (EMI) that has an effect on the antenna 9 used to receive an external radio signal. Consequently, the electromagnetic interference has the problem of deteriorating receiving sensitivity of the antenna 9.

SUMMARY OF THE INVENTION

The present general inventive concept provides a radio receiving apparatus which can reduce electromagnetic interference caused by noise from a printed circuit board, thereby achieving improved receiving sensitivity thereof.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a radio receiving apparatus including a body, a printed circuit board provided in the body, an antenna provided at the outside of the body and adapted to receive an external signal, and a noise attenuation member provided at the printed circuit board and adapted to attenuate noise generated from the printed circuit board, so as to prevent deterioration in receiving sensitivity of the antenna.

The noise attenuation member may include at least one capacitor.

The at least one capacitor may include a plurality of capacitors to surround a portion of the printed circuit board closest to the antenna, so as to prevent the noise generated from the printed circuit board from being propagated toward the antenna.

The printed circuit board may include a dielectric layer provided therein and the capacitors may be arranged in the dielectric layer.

The capacitors may be arranged at an outer surface of the printed circuit board.

When the antenna is provided at an outer side surface of the printed circuit board, the capacitors may have a C-shaped array and surround the portion of the printed circuit board closest to the antenna.

When the antenna is provided at the outside of a corner portion of the printed circuit board, the capacitors may have an L-shaped array and surround the corner portion.

The foregoing and/or other aspects and utilities of the present general inventive concept may also be achieved by providing a radio receiving apparatus including a body to define an outer portion of the radio receiving apparatus, an antenna provided at the body and adapted to receive an external signal, a printed circuit board provided within the body, and a noise attenuation member provided at the printed circuit board and adapted to prevent interference between electromagnetic wave noise generated from the printed circuit board and the signal received by the antenna.

The noise attenuation member may include a capacitor.

The antenna may be provided at the outside of the printed circuit board, and the capacitor may surround a portion of the printed circuit portion closest to the antenna.

The printed circuit board may include a power plane to supply power, a ground plane spaced apart from the power plane, the ground plane serving as the standard plane corresponding to power and a signal, and a dielectric layer provided between the power plane and the ground plane, the capacitor being disposed in the dielectric layer.

The capacitor may be attached to an outer surface of the printed circuit board.

The foregoing and/or other aspects and utilities of the present general inventive concept may also be achieved by providing a radio receiving apparatus, including a body, a circuit board installed at the body, an antenna provided in the body to receive a signal, and a noise attenuation member to reduce interference between the circuit board and the antenna.

The noise attenuation member may reduce the interference between the circuit board and the antenna by decreasing impedance a location near the noise attenuation member.

The noise attenuation member may include at least one capacitor.

The at least one capacitor may be embedded in the circuit board.

The at least one capacitor may be distanced from the antenna to maximize a reduction of an electromagnetic wave field generated by the circuit board.

The foregoing and/or other aspects and utilities of the present general inventive concept may also be achieved by providing a radio receiving apparatus, including a printed circuit board, and a noise attenuation member disposed at a portion of the printed circuit board at which external signals are received wirelessly.

BRIEF DESCRIPTION OF THE DRAWINGS

These and/or other aspects and utilities of the exemplary embodiments of the general inventive concept will become apparent and more readily appreciated from the following description of the embodiments, taken in conjunction with the accompanying drawings, of which.

DETAILED DESCRIPTION OF THE PREFERRED EMBODIMENTS

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Figure 2:
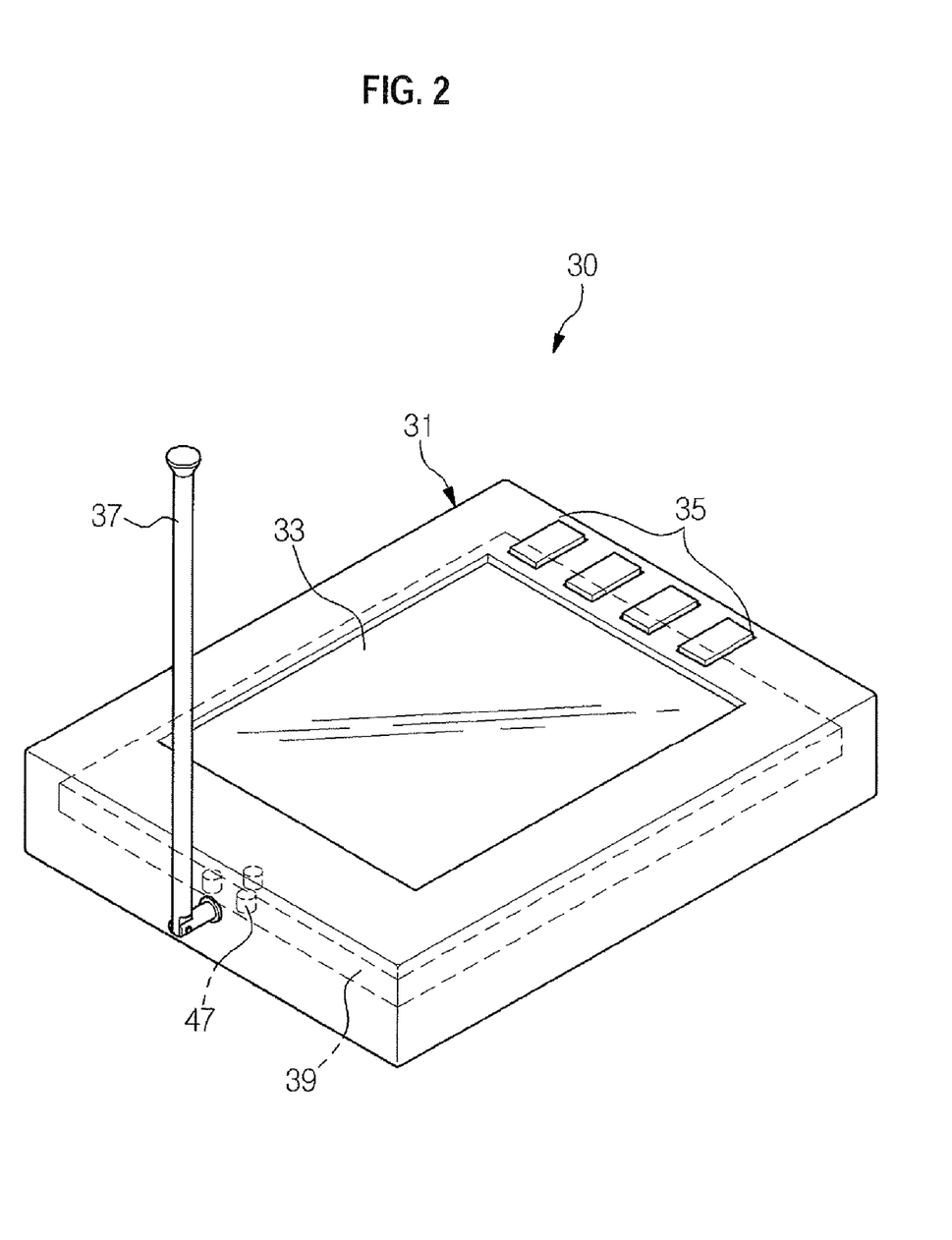
FIG. 2 is a perspective view illustrating a radio receiving apparatus according to an embodiment of the present general inventive concept.

FIG. 2 illustrates a radio receiving apparatus according to an embodiment of the present general inventive concept. As illustrated in FIG. 2, the radio receiving apparatus 30 includes a body 31 which defines an outer portion of the radio receiving apparatus 30, a display 33 provided at a front surface of the body 30 to display an image, a button array 35 provided near the display 33 to manually operate the radio receiving apparatus 30, an antenna 37 attached to an outer side surface of the body 31 to receive a radio signal generated from an external station, and a printed circuit board 39 on which a variety of devices related to the operation of the radio receiving apparatus 30 are arranged. Alternatively, the antenna 37 may be installed inside the body 31 to enhance portability of the radio receiving apparatus 30.

The printed circuit board 39 is provided with a noise attenuating member 47 to attenuate or eliminate an effect of electromagnetic wave noise from the printed circuit board 39 with respect to the antenna 37. The noise attenuating member 47 may take the form of a capacitor. The following description is based on the noise attenuating member 47 in the form of a capacitor.

Although the drawings illustrate a portable multimedia player (PMP), the present general inventive concept is not limited thereto, and any other portable terminals and radio receiving apparatus having a radio communication function may be included within the scope of the present general inventive concept.

Figure 3:
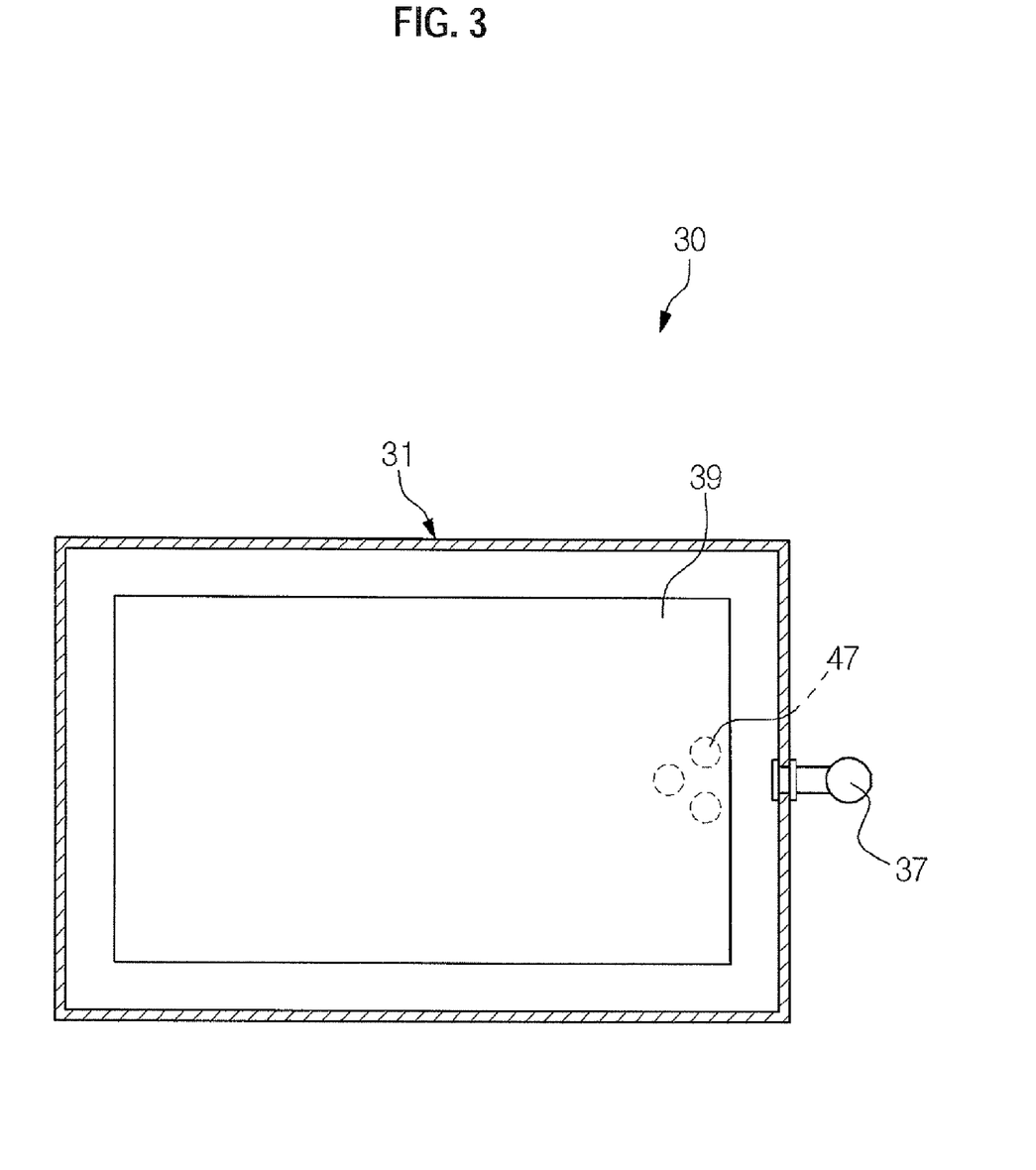
FIG. 3 is a plan sectional view illustrating a first embodiment of the radio receiving apparatus according to an embodiment of the present general inventive concept.

As illustrated in FIG. 3, the antenna 37 may be located at a center portion of the outer side surface of the body 31 at a position close to the printed circuit board 39 that is located within the body 31. Accordingly, a plurality of capacitors 47 may be arranged to surround a portion of the printed circuit board 39 closest to the antenna 37. The capacitors 47 may be arranged in a C-shaped or U-shaped array. Accordingly, the capacitors 47 can attenuate the electromagnetic wave from the printed circuit board 39 in a region close to the antenna 37, thereby reducing interference of electromagnetic wave noise.

Figure 4:
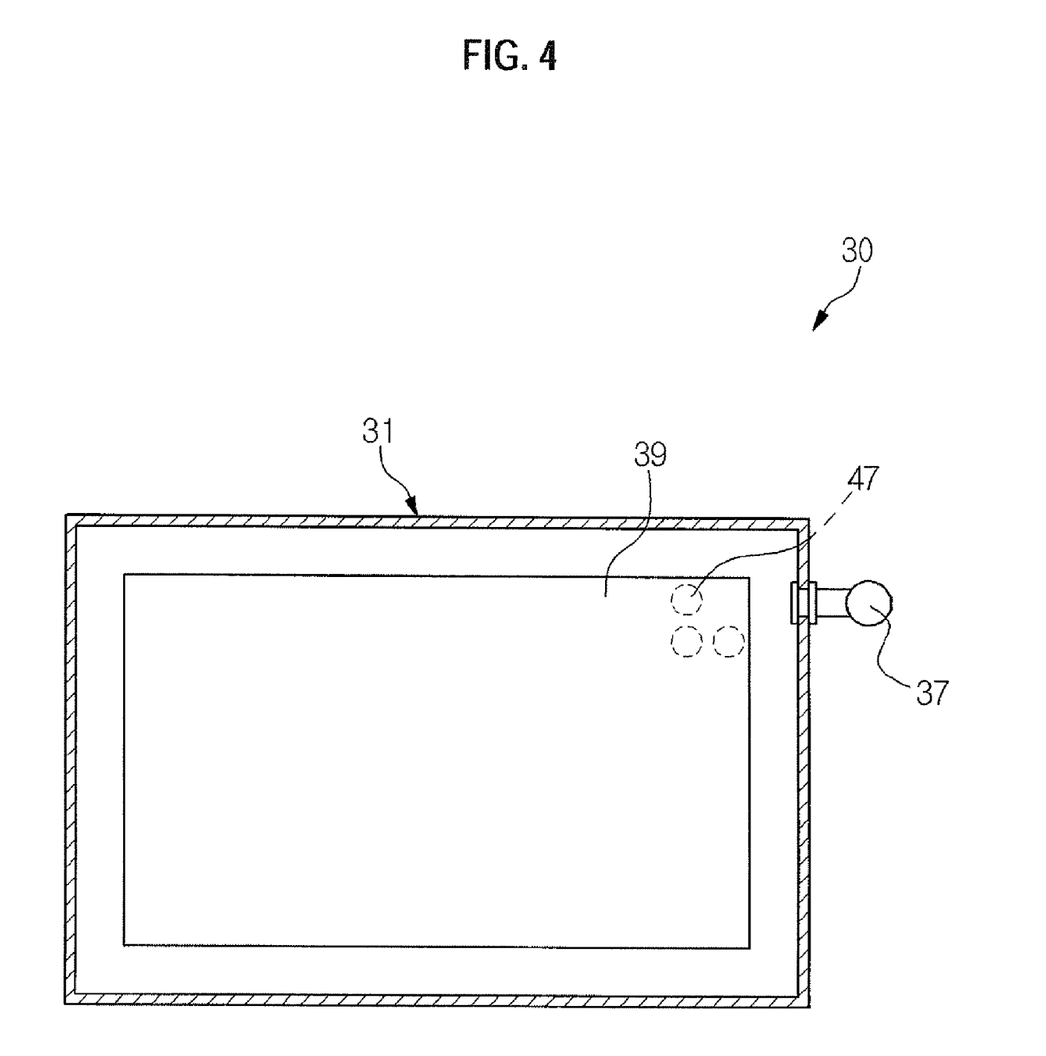
FIG. 4 is a plan sectional view illustrating another embodiment of the radio receiving apparatus.

Referring to FIG. 4, the antenna 37 may be located at a position toward one end of the outer side surface of the body 31. Accordingly, the capacitors 47 may be arranged in a corner portion of the printed circuit board 39.

When the capacitors 47 have an L-shaped or inverted L-shaped array, electromagnetic wave noise around the capacitors 47 can be prevented from affecting the receiving sensitivity of the antenna 37.

Figure 5:
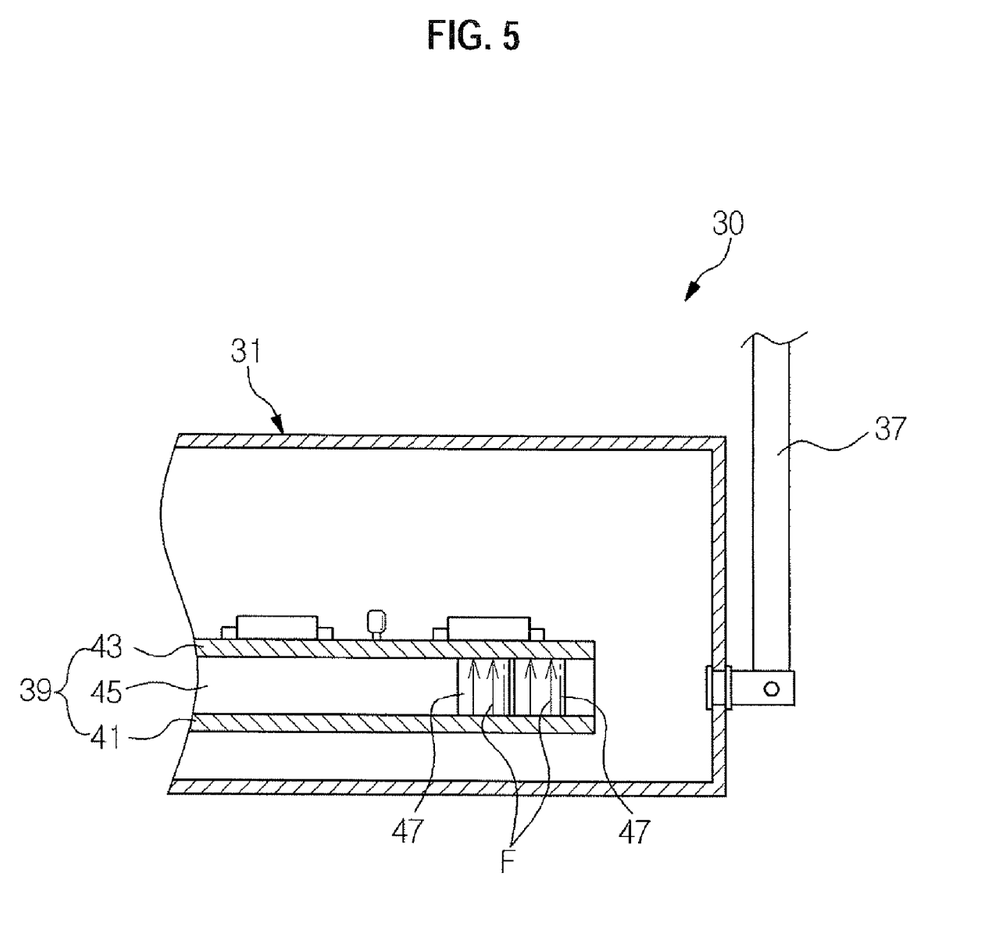
FIG. 5 is a side sectional view illustrating capacitors provided in a printed circuit board of the radio receiving apparatus according to an embodiment of the present general inventive concept.

As illustrated in FIG. 5, the printed circuit board 39 includes a power plane 41 to supply power, a ground plane 43 spaced apart from the power plane 41, the ground plane 43 serving as a standard plane to distribute power and signals, and a dielectric layer 45 provided between the power plane 41 and the ground plane 43.

Furthermore, as illustrated in FIG. 5, a plurality of capacitors 47 can be embedded in the dielectric layer 45 and will be referred to as "embedded chip capacitors."

Using the embedded chip capacitors 47 is beneficial when a variety of devices are required in a limited interior space of the body 31, because the radio receiving device 30 can become much leaner and lighter due to smaller and more compact components. Therefore, embedding the capacitors 47 in the dielectric layer 45 is an efficient way to maximize the available interior space of the body 31.

Figure 6:
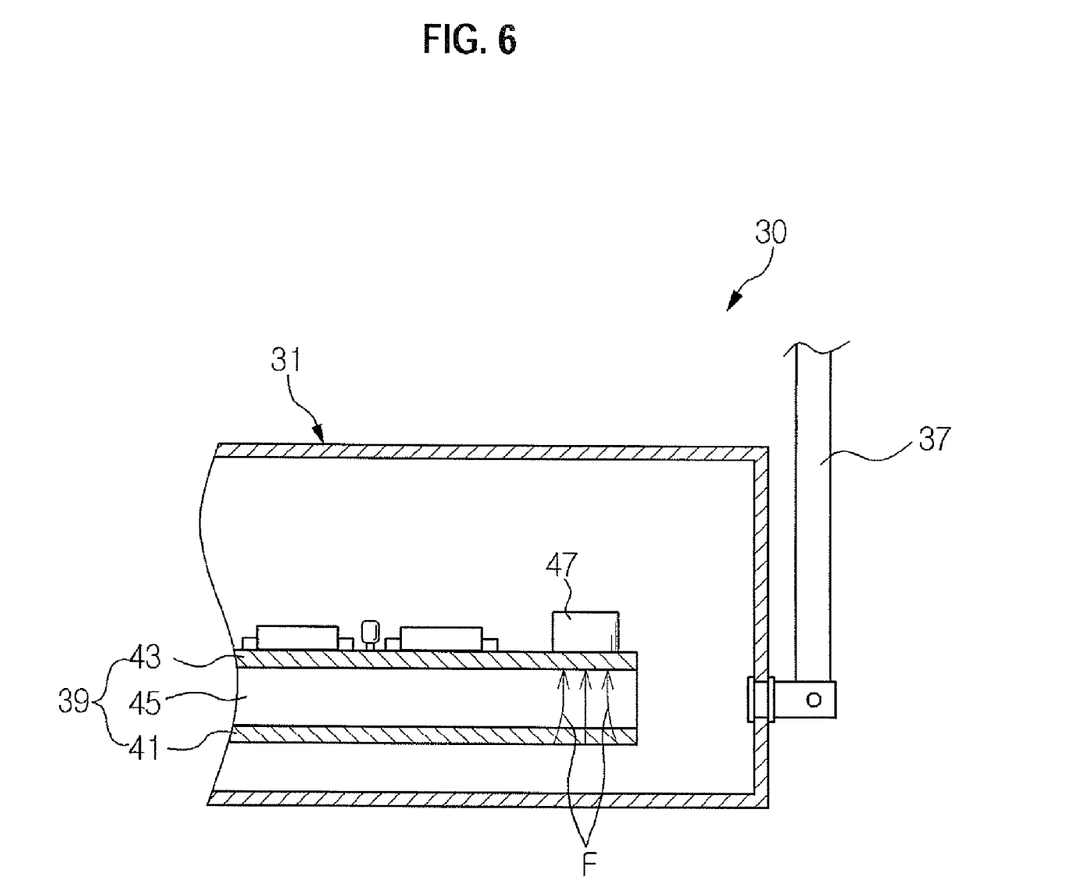
FIG. 6 is a side sectional view illustrating capacitors provided at an outer surface of a printed circuit board of the radio receiving apparatus according to an embodiment of the present general inventive concept.

FIG. 6 illustrates the capacitor 47 being disposed on the ground plane 43, rather than being embedded in the dielectric layer 45. Disposing the capacitor 47 at the outer surface of the printed circuit board 39 is an alternative to embedding the capacitor 47 in the dielectric layer, and will be referred to as a "surface mount device (SMD) type chip capacitor."

As compared to the embedded chip capacitor, the SMD type chip capacitor occupies a slightly larger interior space of the body 31. Although the SMD type chip capacitor performs similar functions as the embedded chip capacitor, the embedded chip capacitor has some advantages over the SMD type chip capacitor. As mentioned above, a benefit of an embedded capacitor includes a reduction in a total number of capacitors mounted on a circuit board surface. Accordingly, components can be spaced in a tighter setting, which can reduce a total size of the circuit board, reduce a number of layers in the circuit board, or reduce a total number of circuit boards required. Another benefit of the embedded capacitor includes improved electrical performance, especially at high frequencies. Embedded capacitors have a much lower inductance than surface mounted capacitors. Accordingly, charge delivery will become faster and there may be a decrease in a lowered power supply voltage. Yet another benefit of the embedded capacitor includes an improvement in system reliability, since a number of solder joints would be reduced. When the above benefits are coupled with reduced capacitor costs, a goal of having a more reliable, better performing, and cost-effective capacitor can be obtained. Accordingly, the SMD type chip capacitor is typically used only as a last resort when the body 31 of a radio receiving device 30 has a larger margin of an available interior space thereof.

Hereinafter, operations of the present general inventive concept will be described with reference to the accompanying drawings.

As illustrated in FIGS. 5 and 6, if the radio receiving apparatus 30 according to an embodiment of the present general inventive concept is in an operating mode, the printed circuit board 39 generates an electromagnetic field F. When the capacitors 47 are included during the operating mode of the radio receiving apparatus 30, the electromagnetic field F is generated in a region around the capacitors 47 as indicated by arrows in FIGS. 5 and 6, and is prevented from being generated in a region which is close to the antenna 37.

If the capacitors 47 are included during the operating mode of the radio receiving apparatus 30, a local region where the capacitors 47 are installed experiences a remarkably reduced impedance, thus causing deflection of the electromagnetic field F. As a result, unlike in conventional systems, no electromagnetic field F is generated from a portion of the printed circuit board 39 which is close to the antenna 37, resulting in only a minimum interference by electromagnetic wave noise.

More specifically, assuming that the impedance is represented by "Z," a relational expression $Z=1/jwC$ (where "C" represents capacitance) is obtained. When the radio receiving apparatus 30 is in an operating mode, if the capacitors 47 have an effective value which is greater than a predetermined value, the impedance Z is lowered, thus causing the electromagnetic field to be concentrated in a low impedance region.

Figure 7:
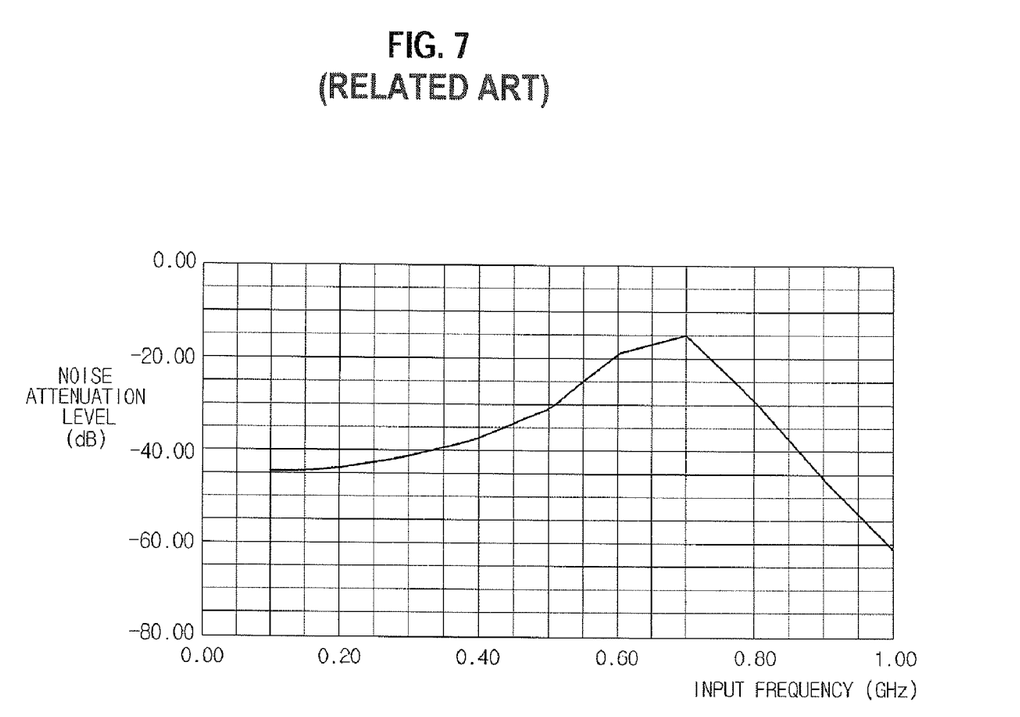
FIG. 7 is a graph illustrating noise attenuation of the conventional radio receiving apparatus.
Figure 8:
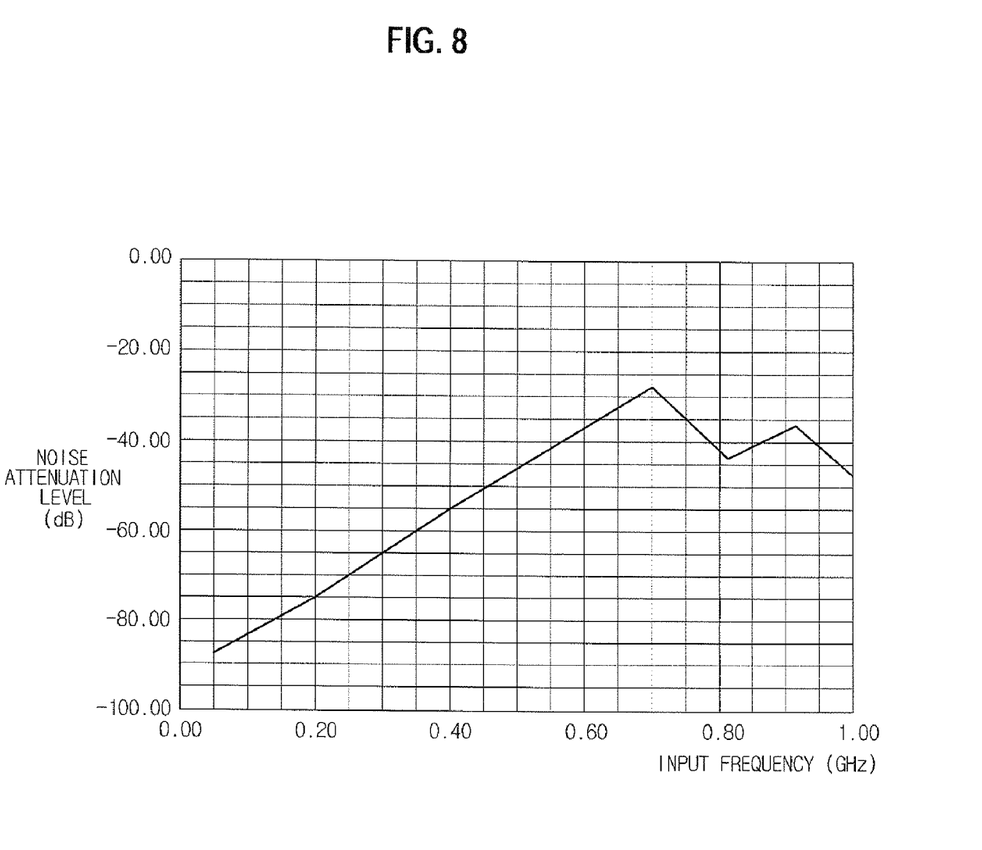
FIG. 8 is a graph illustrating noise attenuation of the radio receiving apparatus according to an embodiment of the present general inventive concept.

FIGS. 7 and 8 are graphs illustrating an attenuation level of electromagnetic wave noise caused by the electromagnetic field of the conventional art and an attenuation level of electromagnetic wave noise caused by an electromagnetic field of embodiments of the present general inventive concept, respectively. The abscissa represents an input frequency which is measured in gigahertz (GHz), and the ordinate represents the attenuation level which is measured in decibels (dB) of electromagnetic wave noise.

Considering the attenuation level of the electromagnetic wave noise of the conventional art, FIG. 7 illustrates the attenuation level of approximately −44 dB at a frequency of 0.2 GHz and the attenuation level of approximately −15 dB at a frequency of 0.7 GHz. However, as illustrated in FIG. 8, in the present general inventive concept, the attenuation level of electromagnetic wave noise is −75 dB at a frequency of 0.2 GHz and approximately −28 dB at a frequency of 0.7 GHz.

Analyzing the above results, the present general inventive concept has a lower interference degree than the conventional art by approximately 75% at an input frequency of 0.2 GHz and by approximately 86% at an input frequency of 0.7 GHz. Accordingly, the radio receiving apparatus 30 of the present general inventive concept can achieve increased receiving sensitivity, and consequently improved reproducibility of an original signal.

Figure 9:
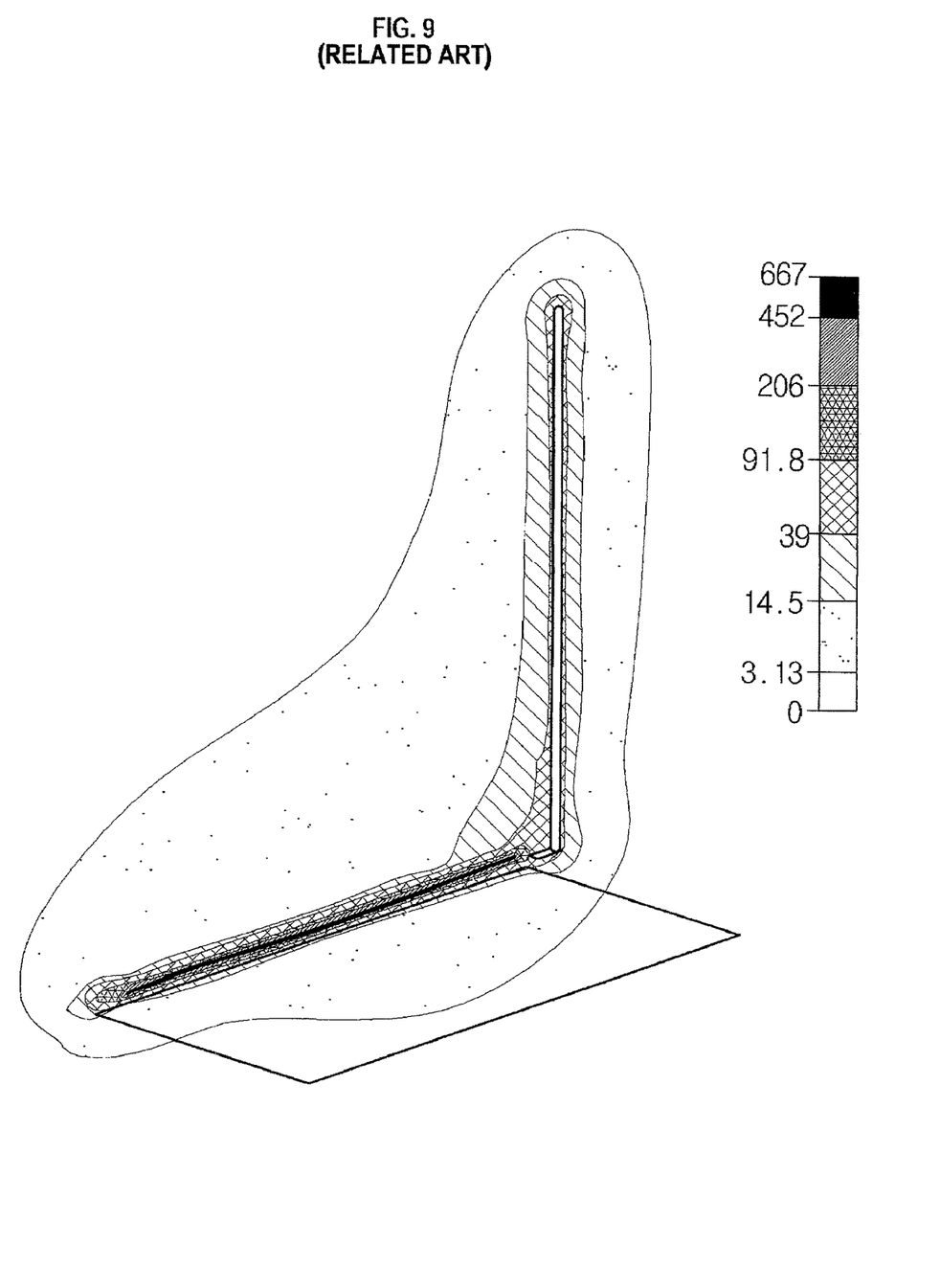
FIG. 9 is a view illustrating electromagnetic wave propagation of the conventional radio receiving apparatus.
Figure 10:
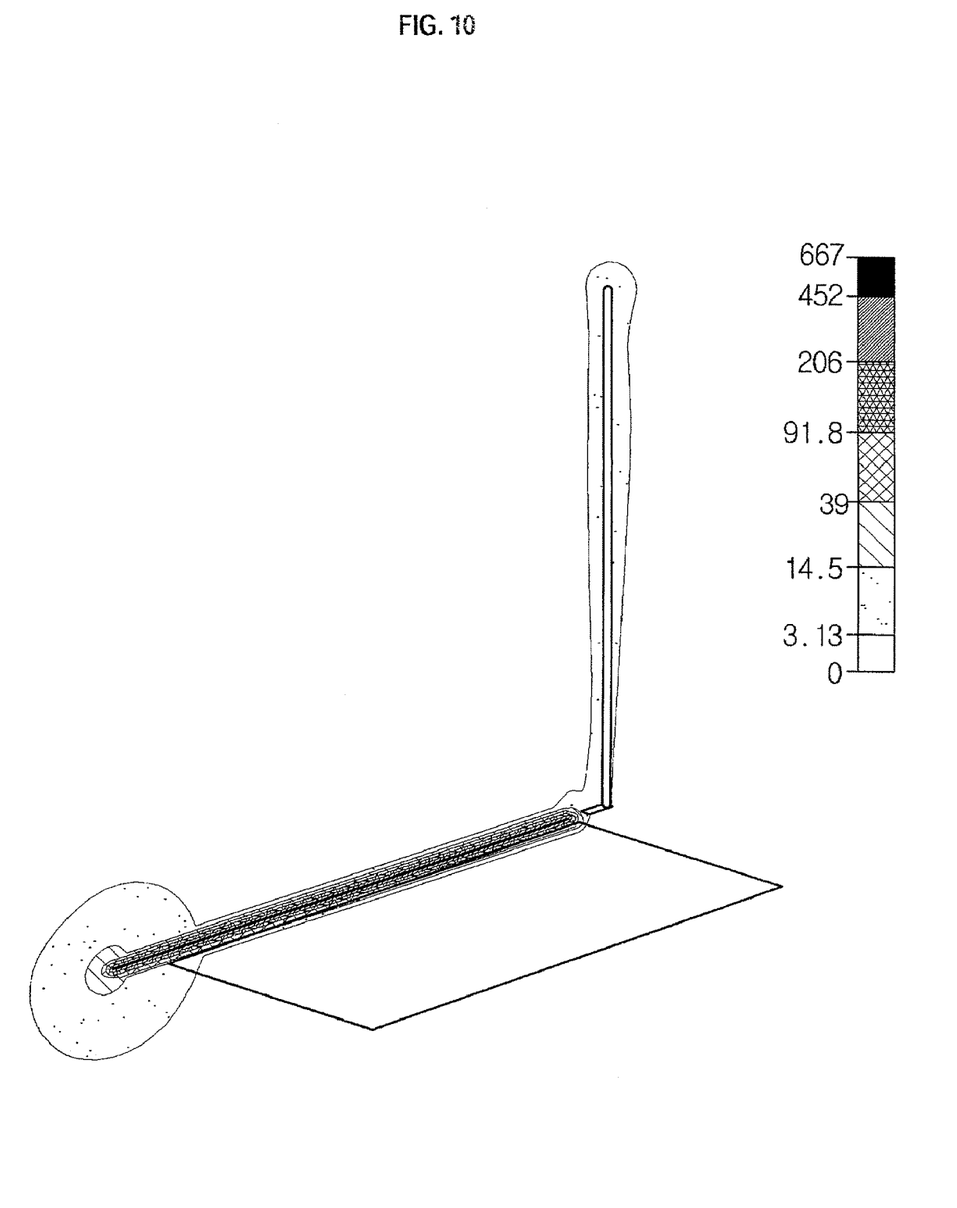
FIG. 10 is a view illustrating electromagnetic wave propagation of the radio receiving apparatus according to an embodiment of the present general inventive concept.

FIGS. 9 and 10 are graphs illustrating propagation of an electromagnetic wave (V/m) according to the conventional art and propagation of an electromagnetic wave according to an embodiment of the present general inventive concept, respectively. A rectangular flat plate illustrated at a bottom portion of FIGS. 9 and 10 denotes a printed circuit board, and a rod vertically erected from a corner portion of the printed circuit board denotes an antenna.

In the conventional art, as illustrated in FIG. 9, a high strength electromagnetic wave is widely propagated to cover the printed circuit board, antenna, and a peripheral space around the printed circuit board and the antenna. Therefore, as illustrated in FIG. 9, the electromagnetic wave of the conventional art is spread out, thereby causing interference and deterioration in the receiving sensitivity of the antenna.

In contrast, an embodiment of the present general inventive concept according to FIG. 10 illustrates where a propagation area of an electromagnetic wave is remarkably reduced as compared to the conventional art. By using capacitors surrounding the corner portion of the printed circuit board in an L-shaped array, the impedance in the corner portion of the printed circuit board is locally attenuated, and consequently, the emission quantity and strength of the electromagnetic wave can be reduced.

By virtue of the reduced emission quantity and strength of the electromagnetic wave, electromagnetic wave noise with respect to the antenna can be remarkably reduced, resulting in an increased receiving sensitivity of the antenna.

As apparent from the above description, according to the present general inventive concept, impedance of a printed circuit board can be locally reduced by including capacitors at the printed circuit board. Accordingly, interference caused by electromagnetic wave noise generated by an electromagnetic wave from a printed circuit board is reduced with respect to an antenna that is used to receive an external signal.

Accordingly, the present general inventive concept can achieve improved receiving sensitivity of a radio receiving apparatus as compared to the prior art, thereby achieving outstanding reproducibility of an original signal received in the radio receiving apparatus.

Although embodiments of the present general inventive concept have been shown and described, it would be appreciated by those skilled in the art that changes may be made in this embodiment without departing from the principles and spirit of the general inventive concept, the scope of which is defined in the claims and their equivalents.

What is claimed is:

1. A radio receiving apparatus, comprising:
   a body;
   a printed circuit board provided in the body;
   an antenna provided at area outside of the body and adapted to receive an external signal; and
   at least one capacitor disposed at an outer portion of the printed circuit board proximate to the antenna and adapted to reduce interference between the printed circuit board and the antenna by attenuating electromagnetic wave noise generated from the printed circuit board.

2. The radio receiving apparatus according to claim 1, wherein the at least one capacitor includes a plurality of capacitors to surround a portion of the printed circuit board closest to the antenna to prevent the noise generated from the printed circuit board from being propagated toward the antenna.

3. The radio receiving apparatus according to claim 2, wherein the printed circuit board comprises:
a dielectric layer provided therein and the capacitors are arranged in the dielectric layer.

4. The radio receiving apparatus according to claim 3, wherein when the antenna is provided at an outer side surface of the printed circuit board, the capacitors have a C-shaped array and surround the portion of the printed circuit board closest to the antenna.

5. The radio receiving apparatus according to claim 3, wherein when the antenna is provided at the outside of a corner portion of the printed circuit board, the capacitors have an L-shaped array and surround the corner portion.

6. The radio receiving apparatus according to claim 2, wherein the capacitors are arranged at an outer surface of the printed circuit board.

7. The radio receiving apparatus according to claim 6, wherein when the antenna is provided at an outer side surface of the printed circuit board, the capacitors have a C-shaped array and surround the portion of the printed circuit board closest to the antenna.

8. The radio receiving apparatus according to claim 6, wherein when the antenna is provided at the outside of a corner portion of the printed circuit board, the capacitors have an L-shaped array and surround the corner portion.

9. A radio receiving apparatus, comprising:
a body to define an outer portion of the radio receiving apparatus;
an antenna provided at the body and adapted to receive an external signal;
a printed circuit board provided within the body; and
at least one capacitor disposed at an outer portion of the printed circuit board proximate to the antenna and adapted to prevent interference between electromagnetic wave noise generated from the printed circuit board and the signal received by the antenna.

10. The radio receiving apparatus according to claim 9, wherein the antenna is provided at the outside of the printed circuit board, and
the capacitor surrounds a portion of the printed circuit portion closest to the antenna.

11. The radio receiving apparatus according to claim 10, wherein the printed circuit board comprises:
a power plane to supply power;
a ground plane spaced apart from the power plane, the ground plane serving as a standard plane corresponding to power and a signal; and
a dielectric layer provided between the power plane and the ground plane, the capacitor being disposed in the dielectric layer.

12. The radio receiving apparatus according to claim 10, wherein the capacitor is attached to an outer surface of the printed circuit board.

13. A radio receiving apparatus, comprising:
a body;
a printed circuit board installed in the body;
an antenna provided at the body to receive a signal; and
at least one capacitor disposed at an outer portion of the printed circuit board proximate to the antenna to reduce interference between the printed circuit board and the antenna.

14. The radio receiving apparatus of claim 13, wherein the at least one capacitor reduces the interference between the circuit board and the antenna by decreasing impedance at a location near the at least one capacitor.

15. The radio receiving apparatus of claim 14, wherein the at least one capacitor is embedded in the circuit board.

16. The radio receiving apparatus of claim 14, wherein the at least one capacitor is distanced from the antenna to maximize a reduction of an electromagnetic wave field generated by the circuit board.

* * * * *